United States Patent
Minemura et al.

(10) Patent No.: US 8,601,493 B2
(45) Date of Patent: Dec. 3, 2013

(54) APPLICATION CONTROLLING APPARATUS AND STORAGE MEDIUM WHICH STORES SOFTWARE FOR THE APPARATUS

(75) Inventors: Harumi Minemura, Tokyo (JP); Atsushi Kohno, Tokyo (JP); Takehiko Koyasu, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1660 days.

(21) Appl. No.: 11/792,865

(22) PCT Filed: Dec. 13, 2005

(86) PCT No.: PCT/JP2005/022871
§ 371 (c)(1),
(2), (4) Date: Jun. 12, 2007

(87) PCT Pub. No.: WO2006/103814
PCT Pub. Date: Oct. 5, 2006

(65) Prior Publication Data
US 2008/0141283 A1    Jun. 12, 2008

(30) Foreign Application Priority Data
Mar. 28, 2005    (JP) ............... P2005-092198

(51) Int. Cl.
  *G06F 9/44*    (2006.01)
  *G06F 9/46*    (2006.01)
  *G06F 13/00*   (2006.01)
  *G06F 11/00*   (2006.01)

(52) U.S. Cl.
  USPC ............ 719/318; 719/320; 719/313; 714/100

(58) Field of Classification Search
  None
  See application file for complete search history.

(56) References Cited

U.S. PATENT DOCUMENTS

| 5,295,246 | A | * | 3/1994 | Bischoff et al. | 710/34 |
| 5,835,765 | A |   | 11/1998 | Matsumoto | |
| 5,931,954 | A | * | 8/1999 | Hoshina et al. | 714/15 |
| 6,148,409 | A | * | 11/2000 | Mores | 713/330 |

(Continued)

FOREIGN PATENT DOCUMENTS

| JP | 8-328880 A | 12/1996 |
| JP | 2000-222227 A | 8/2000 |

(Continued)

OTHER PUBLICATIONS

R.L. Graham, Bounds on Multiprocessing anomolies and related packing algorithms, Bell Telephone Laboratories, Inc., p. 8.*

(Continued)

*Primary Examiner* — H S Sough
*Assistant Examiner* — Craig Dorais
(74) *Attorney, Agent, or Firm* — Birch, Stewart, Kolasch & Birch, LLP

(57) ABSTRACT

An application controlling apparatus includes a basic application storage unit 1 for storing basic applications 31 to 3*n* for implementing basic functions, a basic application execution unit 2 for reading a basic application from the basic application storage unit so as to make the basic application be executed, an extended application acquisition/storage unit 5 for acquiring and storing extended applications 71 to 7*m* for implementing additional functions, an extended application execution unit 6 for reading an extended application from the extended application acquisition/storage unit so as to make the extended application be executed, and a resource monitor unit 8 for monitoring resources currently being consumed by the execution of the extended application, and for stopping a predetermined extended application while keeping the basic application running when the amount of usage of the resources exceeds a predetermined amount.

26 Claims, 3 Drawing Sheets

(56) References Cited

U.S. PATENT DOCUMENTS

| | | | |
|---|---|---|---|
| 6,460,082 B1 | 10/2002 | Lumelsky et al. | |
| 6,772,202 B2 * | 8/2004 | Wright | 709/219 |
| 6,793,625 B2 | 9/2004 | Cavallaro et al. | |
| 7,191,446 B2 * | 3/2007 | Kosanovic | 718/104 |
| 7,376,732 B2 * | 5/2008 | Sample | 709/224 |
| 2004/0048118 A1 * | 3/2004 | Nakaji et al. | 429/22 |

FOREIGN PATENT DOCUMENTS

| | | | | |
|---|---|---|---|---|
| JP | 2001-56772 A | | 2/2001 | |
| JP | 3280322 B2 | | 2/2002 | |
| JP | 2003-6176 A | | 1/2003 | |
| JP | 2003-271397 A | | 9/2003 | |
| JP | 2003271397 A | * | 9/2003 | G06F 9/46 |

OTHER PUBLICATIONS

Machine Translation of Japanese Application, JP 2003371397 A, Yokota, Application Controlling Apparatus and Storage Medium Which Stores Software for the Apparatus, Sep. 2003.*

Shankar Govindan, "Offensive Runways: Defensive DBA", Oracle Knowledge Base, Apr. 25, 2003, pp. 1-11, <http://oracle.ittoolbox.com/documents/peer-publishing/offensive-runaways-defensive-dba-2421#>.

Tetsuo Kamikawa et al., 'Shasai Joho Tanmatsu Framework', Mitsubishi Denki Giho, vol. 77, No. 7, pp. 35 to 38, Mitsubishi Electric Engineering Co., Ltd., Jul. 25, 2003 (CSDB: Kigyo Giho 200400172003), p. 37, right column, line 10 to p. 38, left column, line 16, Fig. 4.

Mariko Okude et al., 'ITS ni Okeru Shasai Joho System no Kento', Transactions of Information Processing Society of Japan, vol. 42, No. 7, pp. 1736 to 1743, Information Processing Society of Japan, Jul. 15, 2001, (CSDB: Kokunai Gakkai Ronbun 200300003001), p. 1738, left column, lines 3 to 44, Fig. 2.

* cited by examiner

APPLICATION CONTROLLING APPARATUS AND STORAGE MEDIUM WHICH STORES SOFTWARE FOR THE APPARATUS

FIELD OF THE INVENTION

The present invention relates to an application controlling apparatus and a storage medium which stores software used for the apparatus. More particularly, it relates to a technology for recovering control when an application falls out of control.

BACKGROUND OF THE INVENTION

Conventionally, an application controlling apparatus which is incorporated into, for example, equipment like a car navigation apparatus, and which manages various application programs (simply referred to as "applications" from here on) so as to make the equipment execute an application properly is known. Applications which are managed by this application controlling apparatus include basic applications for implementing the basic functions of the equipment, and extended applications for implementing additional functions for improving the convenience of the equipment, which are not the basic functions of the equipment.

As such an application controlling apparatus, patent reference 1 discloses an application controlling apparatus which even if an extended application (referred to as an additional application in the reference) hangs up, can return to a management screen provided by an application manager which manages basic applications (referred to as existing applications in the reference) without forcing an application manager which manages the extended application to terminate.

The application controlling apparatus disclosed by this patent reference 1 is constructed so that a basic application is managed by the first application manager and an extended application is managed by the second application manager, and switching from the second application manager to the first application manager is carried out by a screen control unit which can run independently from the second application manager. Thereby, even if an extended application or the second application manager hangs up, the prior art application controlling apparatus can switch to the first application manager's screen.

[Patent Reference 1] JP,2003-271397,A

The application controlling apparatus disclosed by above-mentioned patent reference 1, when an extended application hangs up, can return to the management screen provided by the application manager which manages basic applications without forcing the application manager which manages the extended application to terminate. A problem with the prior art application controlling apparatus is, however, that in the event that an extended application runs away out of control and this results in either exhaustion of the memory of the system or entering into an endless loop and then occupying the CPU (Central Processing Unit), and the application controlling apparatus then falls out of control and the operations of basic applications are therefore affected, the application controlling apparatus cannot take appropriate measures.

The present invention is made in order to solve the problem, and it is therefore an object of the present invention to provide an application controlling apparatus which can take appropriate measures even if an extended application falls out of control, and a storage medium which stores software used for the apparatus.

DISCLOSURE OF THE INVENTION

In accordance with the present invention, there is provided an application controlling apparatus including: a basic application storage means for storing a basic application for implementing a basic function; a basic application execution means for reading a basic application from the basic application storage means so as to make the basic application be executed; an extended application acquisition/storage means for acquiring and storing an extended application for implementing an additional function; an extended application execution means for reading an extended application from the extended application acquisition/storage means so as to make the extended application be executed; and a resource monitor means for monitoring resources currently being consumed by the execution of the extended application, and for stopping a predetermined extended application while keeping the basic application running when an amount of usage of the resources exceeds a predetermined amount.

In accordance with the present invention, there is provided a storage medium which stores software which can be executed by a computer, the software including the steps of: reading a basic application for implementing a basic function from a basic application storage means for storing the basic application so as to make the basic application be executed; reading an extended application for implementing an additional function from an extended application acquisition/storage means for acquiring and storing the extended application so as to make the extended application be executed; monitoring resources currently being consumed by execution of the extended application; and stopping a predetermined extended application while keeping the basic application running when an amount of usage of the resources exceeds a predetermined amount.

The application controlling apparatus in accordance with the present invention is so constructed as to monitor the amount of usage of the resources, judge whether an extended application runs away of control or enters an endless loop so as to determine whether the extended application falls out of control from the amount of usage of the resources, and stop the extended application if needed, by using the resource monitor means. Therefore, even if an extended application falls out of control, the application controlling apparatus can prevent any influence from being exerted upon the operations of basic applications of high importance.

Application of the software stored in the storage medium in accordance with the present invention to an application controlling apparatus can provide the same advantage as provided by the application controlling apparatus in accordance with the above-mentioned first invention.

PREFERRED EMBODIMENTS OF THE INVENTION

Hereafter, in order to explain this invention in greater detail, the preferred embodiments of the present invention will be described with reference to the accompanying drawings.

Hereafter, a case in which an application controlling apparatus in accordance with the present invention is applied to vehicle-mounted equipment will be explained.

Embodiment 1

Figure 1:
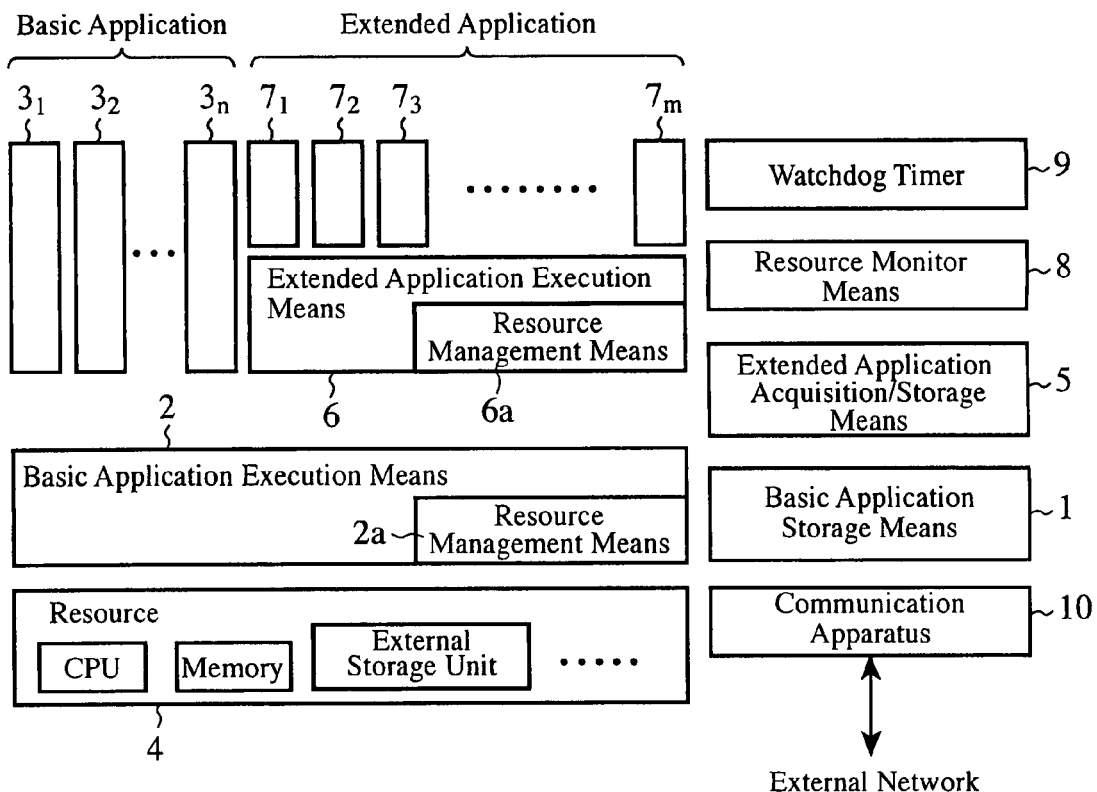
FIG. 1 is a block diagram showing the structure of an application controlling apparatus in accordance with embodiment 1 of the present invention.

FIG. 1 is a block diagram showing the structure of an application controlling apparatus in accordance with embodiment 1 of the present invention. This application controlling apparatus is provided with a basic application storage means 1, a basic application execution means 2, basic applications $3_1$ to $3_n$, resources 4, an extended application acquisition/storage means 5, an extended application execution means 6, extended applications $7_1$ to $7_m$, a resource monitor means 8, a watchdog timer 9, and a communication unit 10. The basic application execution means 2 includes a resource management means 2a. The extended application execution means 6 includes a resource management means 6a.

The basic application storage means 1 consists of, for example, a hard disk or a flash memory. In a case in which the vehicle-mounted equipment is a car navigation apparatus, the basic applications $3_1$ to $3_n$ which are stored in this basic application storage means 1 implement its fundamental functions, such as a navigation function and a route searching function. The basic applications $3_1$ to $3_n$ stored in this basic application storage means 1 are read by the basic application execution means 2.

The basic application execution means 2 has a function of reading the basic applications $3_1$ to $3_n$ from the basic application storage means 1, and making these read basic applications $3_1$ to $3_n$ be executed by using the resources 4. The basic application execution means 2 is a program which can consist of, for example, an operating system (abbreviated as "OS: Operating System" from here on). In this case, the basic applications $3_1$ to $3_n$ run on the OS. The resource management means 2a included in the basic application execution means 2 manages resources which are provided for the basic applications $3_1$ to $3_n$.

The resources 4 consist of, for example, a CPU, a memory and an external storage unit, and are required in order for the basic program and extended program execution means to execute the basic applications $3_1$ to $3_n$ and the extended applications $7_1$ to $7_m$ (which will be mentioned later in detail). While these resources 4 are provided to the basic applications $3_1$ to $3_n$ via the resource management means 2a included in the basic application execution means 2, they are also provided to the extended applications $7_1$ to $7_m$ via the resource management means 6a included in the extended application execution means 6.

The extended application acquisition/storage means 5 consists of, for example, a hard disk or a flash memory. In a case in which the vehicle-mounted equipment is a car navigation apparatus, this extended application acquisition/storage means 5 acquires the extended applications $7_1$ to $7_m$ which are provided to implement, for example, a music playback function and a moving image playback function, etc. which are additional functions of the car navigation apparatus, either via the communication unit 10 connected to an external network, or from an external storage unit in which a storage medium, such as a CD-ROM (Compact Disk Read Only Memory) or a DVD-ROM (Digital Versatile Disk Read Only Memory), is mounted. The extended applications $7_1$ to $7_m$ stored in this extended application acquisition/storage means 5 are read by the extended application execution means 6.

The extended application execution means 6 has a function of reading the extended applications $7_1$ to $7_m$ from the extended application acquisition/storage means 5, and making these read extended applications $7_1$ to $7_m$ be executed using the resources 4. The resources 4 are provided to each of the extended applications $7_1$ to $7_m$ via the resource management means 6a included in the extended application execution means 6. The extended application execution means 6 can consist of, for example, a Java (registered trademark) virtual machine. In this case, the extended applications $7_1$ to $7_m$ are Java (registered trademark) programs which run on the Java (registered trademark) virtual machine. The extended application execution means 6 is implemented as one of the basic applications $3_1$ to $3_n$ (for example, the Java (registered trademark) virtual machine on the OS). The resource management means 6a included in the extended application execution means 6 manages resources which are provided to the extended applications $7_1$ to $7_m$.

When the resource monitor means 8 monitors the usage status of the resources 4 being used by the extended applications $7_1$ to $7_m$ and the amount of usage of the resources 4 exceeds a predetermined amount, the resource monitor means 8 stops a part or all of the extended applications $7_1$ to $7_m$ while keeping the basic applications $3_1$ to $3_n$ running. The details of this resource monitor means 8 will be mentioned later.

The watchdog timer 9 is used in order to monitor the execution times of the extended applications $7_1$ to $7_m$. The extended applications $7_1$ to $7_m$ are so constructed as to reset the watchdog timer 9 at predetermined time intervals. Therefore, the watchdog timer 9 issues an alarm when the extended applications $7_1$ to $7_m$ cannot reset this watchdog timer 9 within a predetermined time period for a certain reason (for example, if an extended application cannot exit from the currently running loop within the program itself).

The communication unit 10 consists of, for example, a mobile phone and a wireless LAN control apparatus, and communicates with an external device via the external network. This communication unit 10 is used in order to acquire the extended applications $7_1$ to $7_m$ from the external device, as mentioned above.

Next, the details of the resource monitor means 8 will be explained. The application controlling apparatus, by adding the above-mentioned extended applications $7_1$ to $7_m$, can add easily any functions which the basic applications $3_1$ to $3_n$ do not have, and, by absorbing discrepancies between CPUs and OSs by using extended application execution means 6, can implement a desired function independent of the CPU and the OS, such as a Java (registered trademark) program.

However, if the extended applications $7_1$ to $7_m$ which are executing additional functions run away of control due to bugs or the like and a lot of resources are consumed, there is a possibility that the operations of the basic applications $3_1$ to $3_n$ which are executing important functions are interfered with. Assuming a case in which the car navigation apparatus implements its navigation function by using the basic applications $3_1$ to $3_n$ while executing, as the extended applications $7_1$ to $7_m$, a game program which is downloaded via the Internet and which is written in Java (registered trademark), there is a fear of occurrence of malfunctions in the navigation function (being unable to provide route guidance at an appropriate timing when the vehicle approaches an intersection, or the like) if the game program updates the screen frequently. The resource monitor means 8 is provided in order to prevent occurrence of such a situation.

Figure 2:
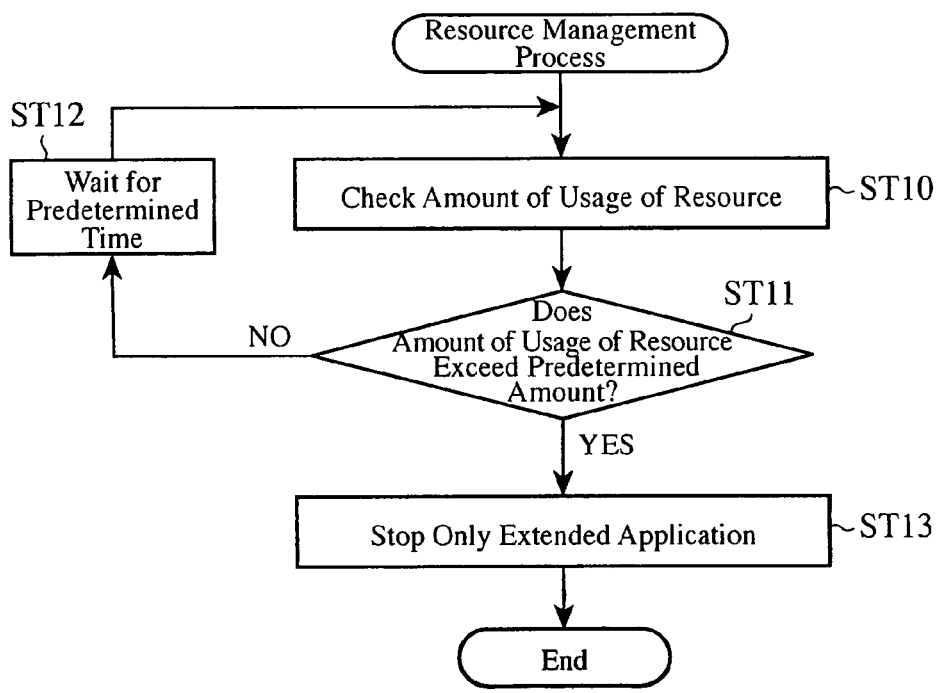
FIG. 2 is a flow chart for explaining the operation of a resource monitor means of the application controlling apparatus in accordance with embodiment 1 of the present invention.

FIG. 2 is a flow chart showing a resource monitoring process carried out by the resource monitor means 8. The resource monitor means 8 checks the amount of usage of the resources 4 first (step ST10). The resource monitor means then checks to see whether the amount of usage of the resources 4 exceeds a predetermined amount (step ST11).

When determining that the amount of usage of the resources 4 does not exceed the predetermined amount, the resource monitor means waits for only a predetermined time period (step ST12), and, after that, returns the sequence to step ST10. In contrast, when, in above-mentioned step ST11, determining that the amount of usage of the resources 4 exceeds the predetermined amount, the resource monitor means stops only the extended applications $7_1$ to $7_m$ (step ST13). The above-mentioned processes implement the function of checking the amount of usage of the resources 4 at predetermined intervals, and stopping only the extended applications $7_1$ to $7_m$ while keeping the basic applications $3_1$ to $3_n$ running when the amount of usage of the resources 4 exceeds the predetermined amount.

As previously explained, although the amount of the resources 4 required for execution of applications, such as a usage ratio of the CPU and an amount of memory, decreases when an application runs away of control or goes into an endless loop, the application controlling apparatus in accordance with embodiment 1 of the present invention monitors the amount of usage of the resources 4, and, if it exceeds the predetermined amount, stops only the extended applications $7_1$ to $7_m$ of generally-less importance than the basic applications $3_1$ to $3_n$. Therefore, the application controlling apparatus can take appropriate measures of not having a bad influence upon the operations of the basic applications $3_1$ to $3_n$ of greater importance.

The application controlling apparatus in accordance with above-mentioned embodiment 1, as shown in the flow chart of FIG. 2, is so constructed as to carry out a check of the amount of usage of the resources 4 at predetermined intervals so as to facilitate the checking process. As an alternative, the application controlling apparatus can be so constructed as to check the amount of usage of the resources 4 when receiving a request for resources from the extended applications $7_1$ to $7_m$. Because it can be assumed that with this structure, the amount of usage of the resources 4 increases at the time when a resource request process is carried out, the amount of usage of the resources 4 can be checked effectively.

The resource monitor means 8 can be alternatively so constructed as to, when, in above-mentioned step ST11, determining that the amount of usage of the resources 4 being used by the extended applications $7_1$ to $7_m$ exceeds the predetermined amount, return an error in response to any future request for resources 4 from the extended applications $7_1$ to $7_m$, instead of stopping the extended applications $7_1$ to $7_m$ in step ST13. With this structure, the resource monitor means can not only keep the basic applications $3_1$ to $3_n$ running, but also keep the extended applications $7_1$ to $7_m$ running if the extended applications $7_1$ to $7_m$ do not make a request for resources 4.

The resource monitor means 8 can be alternatively so constructed as to, when, in above-mentioned step ST11, determining that the amount of usage of the resources 4 being used by the extended applications $7_1$ to $7_m$ exceeds the predetermined amount, return an error in response to any start request from the extended applications $7_1$ to $7_m$ to inhibit a start of new extended applications $7_1$ to $7_m$, instead of stopping the extended applications $7_1$ to $7_m$ in step ST13. With this structure, the resource monitor means can not only keep the basic applications $3_1$ to $3_n$ running, but also keep the extended applications $7_1$ to $7_m$, which have been running, running.

The resource monitor means 8 can also be so constructed as to monitor, as the resources 4 currently being consumed by the execution of extended applications $7_1$ to $7_m$, the usage rate of the CPU, the amount of usage of the memory, the amount of usage of the external storage unit, the number of extended applications $7_1$ to $7_m$ being executed, the number of objects being displayed on the screen, the sum of the areas of the objects being displayed on the screen, or the hardware resources required for the execution of other extended applications $7_1$ to $7_m$. In this case, the resource monitor means 8 can also be so constructed as to monitor a combination of one or more of these factors according to the use or the purpose of the extended applications $7_1$ to $7_m$. With this structure, the resource monitor means can also support a case in which important resources 4 vary according to the use or the purposes of the extended applications $7_1$ to $7_m$.

The resource monitor means 8 can also be so constructed as to monitor not only the amount of usage of the resources 4 being used by the extended applications $7_1$ to $7_m$ but also the amount of usage of the resources 4 being used by the basic applications $3_1$ to $3_n$. With this structure, because a larger amount of the resources 4 can be assigned to the extended applications $7_1$ to $7_m$ if the amount of usage of the resources 4 being used by the basic applications $3_1$ to $3_n$ is small, the extended applications $7_1$ to $7_m$ can use a large amount of the resources 4 when the basic applications $3_1$ to $3_n$ do not use a large amount of the resources 4.

The resource monitor means 8 can also be so constructed as to stop all the extended applications $7_1$ to $7_m$ at a time by stopping the extended application execution means 6, instead of stopping the extended applications $7_1$ to $7_m$ independently, when the amount of usage of the resources 4 being used by the extended applications $7_1$ to $7_m$ exceeds the predetermined amount. With this structure, the resource monitor means can also support a case in which it cannot stop the extended applications $7_1$ to $7_m$ independently for some reason.

In the case in which the resource monitor means is so constructed as to stop the extended application execution means 6 when the amount of usage of the resources 4 being used by the above-mentioned extended applications $7_1$ to $7_m$ exceeds the predetermined amount, the resource monitor means 8 can restart the extended application execution means 6 from its initial state after stopping this extended application execution means 6, and restart all or a part of the extended applications $7_1$ to $7_m$ which were running when stopping the extended application execution means 6 from their initial states. With this structure, the resource monitor means can restore the extended application execution means 6 to a previous state in which it was placed before stopped or a state close to the previous one.

The resource monitor means 8 can also be so constructed as to restart the extended application execution means 6 from its initial state when the amount of usage of the resources 4 returns to equal to or smaller than the predetermined amount after stopping the extended application execution means 6. With this structure, the resource monitor means can restore the extended application execution means 6 to a previous state in which it was placed before stopped or a state close to the previous one when the available amount of the resources 4 is restored.

Similarly, the resource monitor means 8 can be so constructed as to, after stopping all or a part of the extended applications $7_1$ to $7_m$, restart all or the part of the extended applications $7_1$ to $7_m$ stopped from their initial states when the amount of usage of the resources 4 returns to equal to or smaller than the predetermined amount. With this structure, the resource monitor means can restore the extended applications $7_1$ to $7_m$ to a previous state in which they was placed before stopped or a state close to the previous one when the available amount of the resources 4 is restored.

The resource monitor means 8 can also be so constructed as to determine the order in that it should restart the extended applications $7_1$ to $7_m$ from their initial states by using one of the following methods:

(1-1) A method of restarting the extended applications $7_1$ to $7_m$ in descending order of priority set to each of the extended applications $7_1$ to $7_m$ in advance;

(1-2) A method of restarting the extended applications $7_1$ to $7_m$ in increasing order of amount of resource 4 which was being used by each of them at the time when stopped; and (1-3) A method of restarting the extended applications $7_1$ to $7_m$ in increasing order of maximum available amount of the resources set to each of the extended applications $7_1$ to $7_m$ in advance.

The resource monitor means can be further so constructed as not to, after restarting the extended applications $7_1$ to $7_m$ in turn by using one of the methods (1-1) to (1-3), restart the remaining of the extended applications $7_1$ to $7_m$ any more when the amount of usage of the resources 4 exceeds the predetermined amount. With this structure, the application controlling apparatus can use the resources 4 efficiently.

The resource monitor means 8 can be so constructed as to, if connected with the external network via the communication unit 10 after stopping the extended application execution means 6, disconnect this connection, and, after that, restart the extended application execution means 6 from its initial state, and reconnect with the external network via the communication unit 10 when restarting the extended applications $7_1$ to $7_m$ which were running when stopping the extended application execution means 6 from their initial states. Thereby, the application controlling apparatus can also recover the connection with the network.

Similarly, the resource monitor means 8 can be so constructed as to, if connected with the external network via the communication unit 10 after stopping the extended applications $7_1$ to $7_m$, disconnect this connection, and, after that, if the amount of usage of the resources 4 returns to equal to or smaller than the predetermined amount, reconnect with the external network via the communication unit 10 when restarting the extended applications $7_1$ to $7_m$ which were stopped from their initial states. Thereby, the application controlling apparatus can also recover the connection with the network.

In a case in which when the resource monitor means 8 is so constructed as to, when stopping the extended application execution means 6, monitor the extended application execution means 6 by checking whether the extended application execution means 6 is running normally at predetermined intervals by using the watchdog timer 9, the resource monitor means, when stopping the extended application execution means 6, can notify the watchdog timer 9 that it will stop the extended application execution means, and then stop the monitoring using the watchdog timer 9, and, when restarting the extended application execution means 6, can also notify the watchdog timer 9 that it will restart the extended application execution means, and then restart the monitoring using the watchdog timer 9. This structure can thus prevent occurrence of such a situation as that in which it is erroneously judged that, for example, a system abnormality occurs due to a malfunction of the watchdog timer 9, and the whole system is reset.

Similarly, in a case in which the resource monitor means 8 is so constructed as to monitor whether the extended applications $7_1$ to $7_m$ are running normally by using the watchdog timer 9 when stopping the extended applications $7_1$ to $7_m$, the resource monitor means, when stopping the extended applications $7_1$ to $7_m$, can notify the watchdog timer 9 that it will stop the extended applications, and prevent the watchdog timer 9 from malfunctioning, and, when restarting the extended applications $7_1$ to $7_m$, can also notify the watchdog timer 9 that it will restart the extended applications, and then restart the monitoring using the watchdog timer 9. This structure can thus prevent occurrence of such a situation as that in which it is erroneously judged that, for example, a system abnormality occurs due to a malfunction of the watchdog timer 9, and the whole system is reset.

The resource monitor means 8 can be implemented as follows:

(2-1) The resource monitor means can be implemented via one of the extended applications $7_1$ to $7_m$;

(2-2) The resource monitor means can be implemented via a part of the functions of the extended application execution means 6;

(2-3) The resource monitor means can be implemented via one of the basic applications $3_1$ to $3_n$;

(2-4) The resource monitor means can be implemented via a part of the functions of the basic application execution means 2; or (2-5) The resource monitor means can be implemented via a monitoring program which runs on external hardware not shown.

The resource monitor means 8, as the predetermined amount of usage of the resources 4 which it uses as a criterion by which to judge whether to stop the extended applications $7_1$ to $7_m$, can use one of the following values:

(3-1) A fixed value which is set up beforehand;

(3-2) A variation which depends upon the amount of usage of the resources 4 being used by the basic applications $3_1$ to $3_n$, and, in this case, if the amount of usage of the resources 4 being used by the basic applications $3_1$ to $3_n$ is large, a small variation is used;

(3-3) A default which is set up for each of the extended applications $7_1$ to $7_m$, or a value which is set up by the user;

(3-4) A default which depends upon the types of the extended applications $7_1$ to $7_m$, and, for example, a larger amount of the resources can be assigned to the extended applications $7_1$ to $7_m$ if they are downloaded from a reliable site; and (3-5) A default which is set up for each user which has started an extended application, and, for example, a larger amount of the resources can be assigned to an extended application which the driver has started.

Embodiment 2

An application controlling apparatus in accordance with embodiment 2 of the present invention is so constructed as to select some of extended applications $7_1$ to $7_m$ which it will stop when the amount of usage of resources 4 being used by the extended applications $7_1$ to $7_m$ exceeds a predetermined amount.

Figure 3:
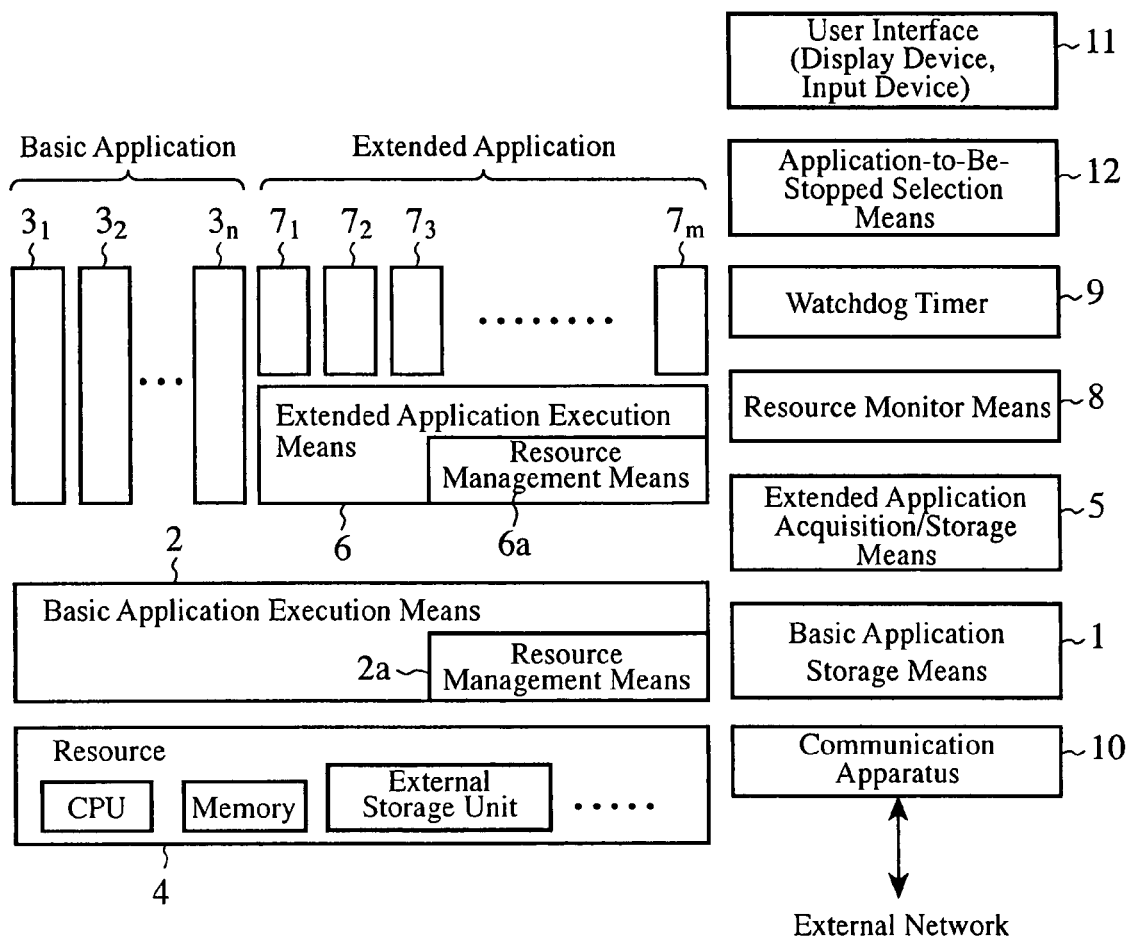
FIG. 3 is a block diagram showing the structure of an application controlling apparatus in accordance with embodiment 2 of the present invention.

FIG. 3 is a block diagram showing the structure of an application controlling apparatus in accordance with embodiment 2 of the present invention. This application controlling apparatus is additionally provided with a user interface 11 and an application-to-be-stopped selection means 12 in addition to the components of the application controlling apparatus in accordance with embodiment 1.

The user interface 11 consists of, for example, a display unit and an input unit. The display unit is used in order to provide a user with a list of running extended applications $7_1$ to $7_m$. The input unit is used in order to allow the user to select one extended application from among the extended applications $7_1$ to $7_m$ provided by the display unit.

The application-to-be-stopped selection means 12 selects some of the extended applications $7_1$ to $7_m$ which are to be stopped when the amount of usage of the resources 4 exceeds the predetermined amount. In this case, the application-to-be-stopped application selection means 12 can be so constructed as to run as follows:

(4-1) The application-to-be-stopped application selection means stops all the running extended applications $7_1$ to $7_m$;

(4-2) The application-to-be-stopped application selection means checks the amount of usage of the resources 4 being used by the extended applications $7_1$ to $7_m$, and selects a predetermined number of extended applications from among the extended applications $7_1$ to $7_m$ in decreasing order of amount of usage of the resources 4, thereby being able to reduce the total amount of usage of the resources 4 greatly;

(4-3) The application-to-be-stopped application selection mean writes a sequential number into a table (not shown), which the extended application execution means 6 uses to manage the extended applications $7_1$ to $7_m$, every time when starting each of the extended applications $7_1$ to $7_m$, and stops a predetermined number of extended applications which are selected from the extended applications $7_1$ to $7_m$ in the order in which they have been started, and, because it can be assumed that some of the extended applications $7_1$ to $7_m$ which were started at earlier times than the remainder of the extended applications $7_1$ to $7_m$ which were started at later times will be used at less frequency, and therefore the influence at the time when stopping some of the extended applications $7_1$ to $7_m$ which were started at earlier times can be reduced;

(4-4) The application-to-be-stopped application selection mean writes a sequential number into a table (not shown), which the extended application execution means 6 uses to manage the extended applications $7_1$ to $7_m$, every time when starting each of the extended applications $7_1$ to $7_m$, and stops a predetermined number of extended applications which are selected from the extended applications $7_1$ to $7_m$ in an order opposite to the order in which they have been started, and, in contrast to the above-mentioned case (4-3), because it can be assumed that some of the extended applications $7_1$ to $7_m$ which have been used for a smaller time period than the remainder of the extended applications $7_1$ to $7_m$ which have been used for a longer time period will be used at less frequency, and therefore the influence at the time when stopping some of the extended applications $7_1$ to $7_m$ which have been used for a smaller time period can be reduced;

(4-5) The application-to-be-stopped application selection mean, when acquiring and storing the extended applications $7_1$ to $7_m$, simultaneously acquires, as additional information on the extended applications $7_1$ to $7_m$, priorities as well as the extended applications $7_1$ to $7_m$ themselves, assigns the priorities to the extended applications $7_1$ to $7_m$, respectively, and stops only a predetermined number of extended applications which are selected from the extended applications $7_1$ to $7_m$ in descending order of priority, thereby being able to stop only lower-priority ones of the extended applications $7_1$ to $7_m$, i.e., only ones of the extended applications $7_1$ to $7_m$ which have a little influence upon the operation of the vehicle-mounted equipment even if they are stopped;

(4-6) The application-to-be-stopped application selection mean displays a list of running extended applications $7_1$ to $7_m$ on the display unit of the user interface 11 to provide them to the user, and makes the user select only a predetermined number of extended applications to be stopped from among the extended applications $7_1$ to $7_m$, thereby being able to prevent some of the extended applications $7_1$ to $7_m$ which the user does not desire to stop from being accidentally stopped;

(4-7) In the above-mentioned case (4-6), the application-to-be-stopped application selection mean determines extended applications $7_1$ to $7_m$ which are to be provided to the user on the basis of the amount of usage of the resources 4 and their priorities, thereby being able to provide only some of the extended applications $7_1$ to $7_m$ having a middle amount of usage of the resources 4 and a middle priority for the user so as to make the user select some of them, and being able to unconditionally stop some of the extended applications $7_1$ to $7_m$ having a larger amount of usage of the resources 4 or a lower priority and to unconditionally keep the remainder of the extended applications $7_1$ to $7_m$ having a smaller amount of usage of the resources 4 or a higher priority running;

(4-8) In either of the above-mentioned cases (4-2) to (4-7), the application-to-be-stopped application selection mean stops the extended applications $7_1$ to $7_m$ in turn until the amount of usage of the resources 4 becomes equal to or smaller than the predetermined amount, instead of stopping only a predetermined number of extended applications which are selected from the extended applications $7_1$ to $7_m$, thereby eliminating the necessity to stop the extended applications $7_1$ to $7_m$ superfluously;

(4-9) When acquiring and storing extended applications $7_1$ to $7_m$, the application-to-be-stopped application selection mean simultaneously acquires, as extended application additional information, a flag indicating whether or not each of the extended applications can be stopped, as well as the extended applications $7_1$ to $7_m$ themselves, sets the flag to each of the extended applications $7_1$ to $7_m$, and stops only ones which can be stopped of the extended applications $7_1$ to $7_m$, thereby being able to prevent the ones of the extended applications $7_1$ to $7_m$ which cause a problem if stopped from being stopped; and (4-10) The application-to-be-stopped application selection mean stops all ones of the extended applications $7_1$ to $7_m$ whose amount of usage of the resources 4 is equal to or larger than the predetermined amount, thereby being able to reduce the total amount of usage of the resources 4 greatly.

As previously explained, the application controlling apparatus in accordance with embodiment 2 of the present invention can stop extended applications $7_1$ to $7_m$ under various conditions. Therefore, the application controlling apparatus can construct a suitable system according to the use or the purpose thereof.

Embodiment 3

An application controlling apparatus in accordance with embodiment 3 of the present invention is so constructed as to control a stop of extended applications $7_1$ to $7_m$ using information on a vehicle in a case in which the application controlling apparatus is applied to vehicle-mounted equipment. From the viewpoint of the security of the vehicle, it is more important to prevent such basic applications $3_1$ to $3_n$ as those which serve as a navigation function from aborting while the vehicle is traveling as compared with during a stop. To solve this problem, this application controlling apparatus judges whether the vehicle is traveling or at a stop so as to carry out a finer process.

Figure 4:
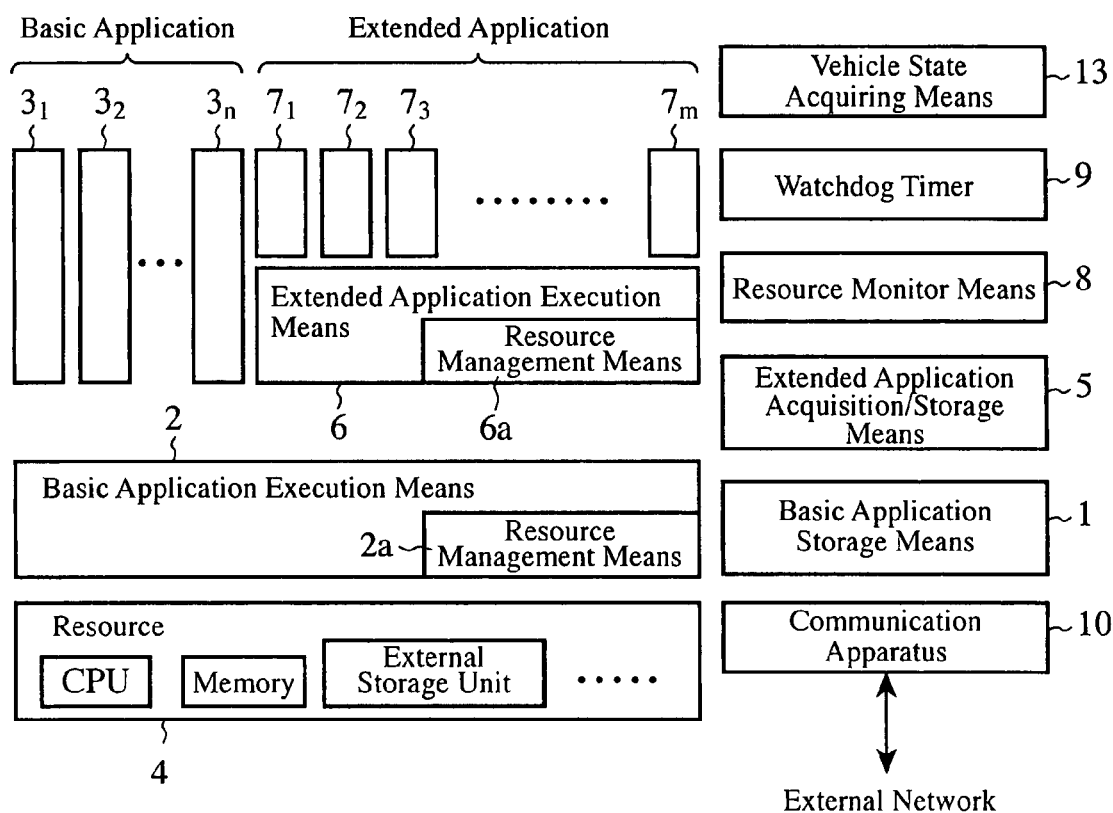
FIG. 4 is a block diagram showing the structure of an application controlling apparatus in accordance with embodiment 3 of the present invention.

FIG. 4 is a block diagram showing the structure of the application controlling apparatus in accordance with embodiment 3 of the present invention. This application controlling apparatus additionally includes a vehicle state acquiring means 13 in addition to the components of the application controlling apparatus in accordance with embodiment 1. The vehicle state acquiring means 13 acquires information indicating the state of the vehicle, for example, information indicating whether the vehicle is at a stop or traveling from a vehicle state detecting means not shown, for example, a velocity sensor.

As previously explained, the application controlling apparatus in accordance with above-mentioned embodiment 1 is so constructed as to check the amount of usage of resources 4 at predetermined intervals or when a resource request is made by the extended applications $7_1$ to $7_m$. In contrast, in the application controlling apparatus in accordance with this embodiment 3, the resource monitor means 8 checks the amount of usage of the resources 4 while changing the length of intervals at which it performs the checking according to the state of the vehicle acquired by the vehicle state acquiring means 13. For example, the resource monitor means checks the amount of usage of the resources 4 at long time intervals when the vehicle is at a stop, whereas it checks the amount of usage of the resources 4 at short time intervals when the vehicle is traveling.

With this structure, by shortening the length of the intervals at which the resource monitor means 8 checks the amount of usage of the resources 4 while the vehicle is traveling as compared with that of the intervals at which it checks the amount of usage of the resources 4 while the vehicle is at a stop, even when the amount of usage of the resources 4 increases rapidly while the vehicle is traveling, the resource monitor means 8 can detect the rapid increase promptly and stop the extended applications $7_1$ to $7_m$. Therefore, during the vehicle's traveling during which the risk factor is high and it is important not to stop the basic applications $3_1$ to $3_n$, the resource monitor means can check the amount of usage of the resources 4 finely.

In addition, in the application controlling apparatus in accordance with above-mentioned embodiment 1, the resource monitor means 8 is so constructed as to use, as the predetermined amount of usage of the resources 4 which is defined as a criterion for stopping the extended applications $7_1$ to $7_m$, a fixed value which is set up beforehand, a variation depending upon the amount of usage of the resources 4 being used by the basic applications $3_1$ to $3_n$, a default or a user-defined value which is set up for each of the extended applications $7_1$ to $7_m$, a default depending upon the types of the extended applications $7_1$ to $7_m$, or a default which is set up for each user which has started the extended applications $7_1$ to $7_m$. In contrast, in the application controlling apparatus in accordance with this embodiment 3, the resource monitor means 8 is so constructed as to use, as the predetermined amount of usage of the resources 4 which is defined as a criterion for stopping the extended applications $7_1$ to $7_m$, a variation depending upon the state of the vehicle acquired by the vehicle state acquiring means 13. To be more specific, when the vehicle is traveling, the allowable amount of usage of the resources 4 is set to be smaller than that at the time when the vehicle is at a stop. With this structure, because the extended applications $7_1$ to $7_m$ are stopped in a state in which the amount of usage of the resources 4 being used by the extended applications $7_1$ to $7_m$ is smaller, the influence upon the basic applications $3_1$ to $3_n$ can be reduced.

The basic application execution means 2, the resource management means 2a, the extended application execution means 6, the resource management means 6a, the resource monitor means 8, the application-to-be-stopped selection means 12 and the vehicle state acquiring means 13, which construct the application controlling apparatus in accordance with either of above-mentioned embodiments 1 to 3, can be implemented via software which can be executed by a computer, and a storage medium which stores this software can be installed into an information processing apparatus so that it can be executed. In this case, the same operation as the application controlling apparatus in accordance with either of above-mentioned embodiments 1 to 3 can be performed and the same advantage as the application controlling apparatus in accordance with either of above-mentioned embodiments 1 to 3 can be provided.

INDUSTRIAL APPLICABILITY

As mentioned above, the application controlling apparatus in accordance with the present invention and a storage medium which stores the application controlling apparatus can take appropriate measures even if an extended application falls out of control, and is suitable for use in such equipment as a car navigation apparatus.

The invention claimed is:
1. An application controlling apparatus comprising:
a basic application storage means for storing a basic application for implementing a basic function;
a basic application execution unit for reading a basic application from said basic application storage means so as to make the basic application be executed;
an extended application acquisition/storage means for storing an extended application for implementing an additional function;
an extended application execution unit for reading the extended application from said extended application acquisition/storage means so as to make the extended application be executed; and
a resource monitor unit configured to:
monitor resources currently being consumed by the execution of said extended application by measuring an amount of usage of said resources and comparing said amount to a predetermined threshold, and
automatically stop a predetermined extended application thereby freeing up the monitored resources consumed by the stopped extended application without user intervention, while keeping the basic application running, when an amount of usage of said resources exceeds a predetermined amount,
wherein the monitored resources include usage of a computer processor, and
wherein after the amount of usage of the resources being used by extended applications exceeds the predetermined amount, the resource monitor unit returns an error to a request for resources from said extended application, and inhibits a start of any other extended application.

2. The application controlling apparatus according to claim 1, wherein said apparatus includes an application-to-be-stopped selection unit for selecting an extended application which is to be stopped when the amount of usage of the resources being used by extended applications exceeds the predetermined amount, and the resource monitor unit stops the extended application selected by said application-to-be-stopped selection unit when the amount of usage of resources being used by extended applications exceeds the predetermined amount.

3. The application controlling apparatus according to claim 1, wherein the resource monitor unit monitors, as the resources currently being consumed by the execution of the extended application, at least one of a usage rate of a CPU, an amount of usage of a memory, an amount of usage of an external storage unit, a number of extended applications being executed, a number of objects displayed on a screen, and a sum of areas of the objects displayed on a screen.

4. The application controlling apparatus according to claim 1, wherein the resource monitor unit also monitors an amount of usage of resources being used by basic applications, in addition to the amount of usage of the resources being used by extended applications.

5. The application controlling apparatus according to claim 1, wherein the resource monitor unit stops extended applications by stopping the extended application execution unit when the amount of usage of the resources being used by extended applications exceeds the predetermined amount.

6. The application controlling apparatus according to claim 5, wherein the resource monitor unit restarts the stopped extended application execution unit from a previous state thereof before said extended application execution unit was stopped.

7. The application controlling apparatus according to claim 6, wherein the resource monitor unit restarts the stopped extended application execution means from its previous state before being stopped when the amount of usage of the resources returns to an amount equal to or smaller than the predetermined amount after stopping the extended application execution unit.

8. The application controlling apparatus according to claim 1, wherein the resource monitor unit restarts the stopped extended application from a previous state thereof before being stopped when the amount of usage of the resources returns to an amount equal to or smaller than the predetermined amount.

9. The application controlling apparatus according to claim 8,
wherein the resource monitor unit restarts stopped extended applications from their previous states before being stopped according to one of the following sequences:
  in descending order of priority assigned to each of the extended applications in advance,
  in increasing order of an amount of resources used by each of the extended applications when stopped, or
  in increasing order of a maximum amount of usage of resources set to each of the extended applications in advance, and
wherein the resource monitor unit stops the restarting in progress when the amount of usage of the resources exceeds the predetermined amount as a result of the restarting.

10. The application controlling apparatus according to claim 6,
wherein said apparatus includes a communication unit which carries out communications via an external network, and
wherein, if the resource monitor unit is connected to the external network via said communication unit when stopping the extended application execution unit, the resource monitor unit disconnects this connection, and thereafter restarts said extended application execution unit from its previous state before being stopped, and reconnects to the external network via said communication unit when restarting extended applications, which were running when said extended application execution unit was stopped, from their previous states before being stopped.

11. The application controlling apparatus according to claim 8,
wherein said apparatus includes a communication unit which carries out communications via an external network, and
wherein, if the resource monitor unit is connected to the external network via said communication unit when stopping the extended application execution unit, the resource monitor unit disconnects this connection, and thereafter, if the amount of usage of the resources returns to an amount equal to or smaller than the predetermined amount, the resource monitor unit reconnects to the external network via said communication unit when restarting stopped extended applications from their previous states before being stopped.

12. The application controlling apparatus according to claim 6, wherein said apparatus includes a watchdog timer for monitoring the extended application execution unit by checking to see whether or not said extended application execution unit is running normally at predetermined intervals, and the resource monitor unit stops the monitoring of said watchdog timer when stopping said extended application execution unit, and, thereafter, restarts said extended application execution unit from its previous state before being stopped and makes said watchdog timer restart the monitoring when restarting extended applications which were running when said extended application execution unit was stopped, from their previous states before being stopped.

13. The application controlling apparatus according to claim 8, wherein said apparatus includes a watchdog timer for monitoring extended applications by checking to see whether or not said extended applications are running normally at predetermined intervals, and the resource monitor unit stops the monitoring of said watchdog timer when stopping extended applications, and thereafter, if the amount of usage of the resources returns to an amount equal to or smaller than the predetermined amount, makes said watchdog timer restart the monitoring when restarting the stopped extended applications from their previous states before being stopped.

14. The application controlling apparatus according to claim 1, wherein the resource monitor unit checks to see whether the amount of usage of the resources exceeds the predetermined amount at predetermined intervals or when an extended application makes a request for resources.

15. The application controlling apparatus according to claim 1, wherein said apparatus includes a vehicle state acquiring unit for acquiring a state of a vehicle, and the resource monitor unit changes a length of intervals at which it checks to see whether the amount of usage of the resources exceeds the predetermined amount according to the state of the vehicle acquired by said vehicle state acquiring unit.

16. The application controlling apparatus according to claim 1, wherein the resource monitor unit is constructed as one extended application, a part of functions of the extended application execution unit, one basic application, a part of functions of the basic application execution unit, or a supervisory program which runs on external hardware.

17. The application controlling apparatus according to claim 1, wherein the resource monitor unit uses, as the predetermined amount of usage of resources which is used as a criterion for stopping extended applications, a fixed value which is set up beforehand, a variation depending upon an amount of usage of resources being used by basic applications, a default or a user-defined value which is set up for each extended application, a default depending upon a type of extended applications, or a default which is set up for each user which has started an extended application.

18. The application controlling apparatus according to claim 1, wherein said apparatus includes a vehicle state acquiring unit for acquiring a state of a vehicle, and the resource monitor unit uses, as the predetermined amount of usage of resources which is used as a criterion for stopping extended applications, a variation depending upon the state of the vehicle acquired by said vehicle state acquiring unit.

19. The application controlling apparatus according to claim 2, wherein said application-to-be-stopped selection unit selects extended applications in ascending order of priority assigned to each of the extended applications in advance.

20. The application controlling apparatus according to claim 2, wherein the application-to-be-stopped application selection unit selects extended applications in an order opposite to an order in which the extended applications have been started.

21. The application controlling apparatus according to claim 1, wherein said extended application acquisition/storage means downloads the extended application via a communication unit connected to an external network.

22. The application controlling apparatus according to claim 1, wherein the basic application runs on an operating system, and the extended application runs on said extended application execution unit.

23. The application controlling apparatus according to claim 1, wherein said resource monitor unit is further configured to monitor resources currently being consumed by the execution of the basic application in addition to the extended application.

24. The application controlling apparatus according to claim 3, wherein said resource monitor unit is further configured to monitor resources currently being consumed by the execution of the basic application in addition to the extended application.

25. A storage medium which stores software which can be executed by a computer to perform a process comprising the steps of:
   reading a basic application for implementing a basic function from a basic application storage means for storing the basic application so as to make the basic application be executed;
   reading an extended application for implementing an additional function from a storage device in which the extended application has been acquired and stored, and executing the read extended application;
   monitoring resources currently being consumed by execution of said extended application by measuring an amount of usage of said resources and comparing said amount to a predetermined threshold; and
   automatically stopping a predetermined extended application thereby freeing up the monitored resources consumed by the stopped extended application without user intervention, while keeping the basic application running, when an amount of usage of said resources exceeds a predetermined amount,
   wherein the monitored resources include usage of a computer processor, and
   wherein after the amount of usage of the resources being used by extended applications exceeds the predetermined amount, an error is returned to a request for resources from said extended application, and a start of any other extended application is inhibited.

26. A method comprising:
   storing a basic application for implementing a basic function in a basic application storage means;
   reading a basic application from said basic application storage means, and executing the basic application using a computer processor;
   storing an extended application for implementing an additional function in an extended application acquisition/storage means;
   reading the extended application from said extended application acquisition/storage means, and executing the extended application using the computer processor;
   monitoring resources currently being consumed by the execution of said extended application by measuring an amount of usage of said resources and comparing said amount to a predetermined threshold; and
   automatically stopping a predetermined extended application thereby freeing up the monitored resources consumed by the stopped extended application without user intervention, while keeping the basic application running, when an amount of usage of said resources exceeds a predetermined amount,
   wherein the monitored resources include usage of the computer processor, and
   wherein after the amount of usage of the resources being used by extended applications exceeds the predetermined amount, an error is returned to a request for resources from said extended application, and a start of any other extended application is inhibited.

* * * * *